US010370095B2

(12) United States Patent
Won et al.

(10) Patent No.: US 10,370,095 B2
(45) Date of Patent: Aug. 6, 2019

(54) VERTICAL TAKE-OFF AND LANDING (VTOL) WINGED AIR VEHICLE WITH COMPLEMENTARY ANGLED ROTORS

(71) Applicant: AeroVironment, Inc., Monrovia, CA (US)

(72) Inventors: Henry Thome Won, Simi Valley, CA (US); Quentin Lindsey, Canoga Park, CA (US)

(73) Assignee: AEROVIRONMENT, INC., Monrovia, CA (US)

( * ) Notice: Subject to any disclaimer, the term of this patent is extended or adjusted under 35 U.S.C. 154(b) by 140 days.

(21) Appl. No.: 15/612,671

(22) Filed: Jun. 2, 2017

(65) Prior Publication Data

US 2018/0002003 A1 Jan. 4, 2018

Related U.S. Application Data

(60) Provisional application No. 62/345,618, filed on Jun. 3, 2016.

(51) Int. Cl.
*B64C 39/02* (2006.01)
*B64C 27/26* (2006.01)
*B64C 29/02* (2006.01)

(52) U.S. Cl.
CPC .............. *B64C 27/26* (2013.01); *B64C 39/02* (2013.01); *B64C 39/024* (2013.01); *B64C 29/02* (2013.01); *B64C 2201/088* (2013.01); *B64C 2201/104* (2013.01); *B64C 2201/108* (2013.01); *B64C 2201/165* (2013.01)

(58) Field of Classification Search
CPC ... B64C 27/50; B64C 29/02; B64C 2201/021; B64C 2201/042; B64C 2201/088; B64C 2201/104; B64C 2201/108; G05D 1/0858
See application file for complete search history.

(56) References Cited

U.S. PATENT DOCUMENTS

| | | | | |
|---|---|---|---|---|
| 5,419,514 A | * | 5/1995 | Ducan ................. | B64C 29/0033 244/12.4 |
| 5,765,783 A | * | 6/1998 | Albion ................... | B64C 29/02 244/17.23 |
| 6,293,491 B1 | * | 9/2001 | Wobben ................. | B64C 27/00 244/17.23 |
| 7,159,817 B2 | * | 1/2007 | VanderMey ........ | B64C 29/0016 244/12.1 |

(Continued)

FOREIGN PATENT DOCUMENTS

WO 2013104007 A1 7/2013

OTHER PUBLICATIONS

International Search Report for Serial No. PCT/US17/35742 dated Nov. 17, 2017.

*Primary Examiner* — Philip J Bonzell
(74) *Attorney, Agent, or Firm* — Brooks Acordia IP Law, PC; Michael Zarrabian; Eric Aagaard

(57) ABSTRACT

Systems, devices, and methods for an aircraft having a fuselage (110); a wing (120) extending from both sides of the fuselage; a first pair of motors (132b, 133b) disposed at a first end of the wing; and a second pair of motors (142b, 143b) disposed at a second end of the wing; where each motor is angled (381, 382, 391, 392) to provide a component of thrust by a propeller (134, 135, 144, 145) attached thereto that for a desired aircraft movement applies a resulting torque additive to the resulting torque created by rotating the propellers.

20 Claims, 9 Drawing Sheets

(56) References Cited

U.S. PATENT DOCUMENTS

| | | | |
|---|---|---|---|
| 8,800,931 B2* | 8/2014 | Vander Lind | A63H 27/002 |
| | | | 244/154 |
| 9,187,174 B2* | 11/2015 | Shaw | B64C 27/28 |
| 9,550,567 B1* | 1/2017 | Erdozain, Jr. | B64C 29/02 |
| 9,669,924 B2* | 6/2017 | Chan | B64C 29/02 |
| 9,676,488 B2* | 6/2017 | Alber | B64C 29/02 |
| 9,714,087 B2* | 7/2017 | Matsuda | B64C 29/02 |
| 9,908,615 B2* | 3/2018 | Alber | B64C 13/16 |
| 9,994,313 B2* | 6/2018 | Claridge | B64C 29/02 |
| 2005/0178879 A1 | 8/2005 | Mao | |
| 2006/0151666 A1* | 7/2006 | VanderMey | B64C 29/0016 |
| | | | 244/12.3 |
| 2010/0283253 A1* | 11/2010 | Bevirt | F03D 1/02 |
| | | | 290/55 |
| 2010/0295320 A1* | 11/2010 | Bevirt | B64C 39/022 |
| | | | 290/55 |
| 2010/0295321 A1* | 11/2010 | Bevirt | B64C 39/022 |
| | | | 290/55 |
| 2011/0121570 A1* | 5/2011 | Bevirt | F03D 5/06 |
| | | | 290/44 |
| 2012/0261523 A1* | 10/2012 | Shaw | B64C 29/0033 |
| | | | 244/7 R |
| 2014/0217229 A1 | 8/2014 | Chan | |
| 2015/0284079 A1* | 10/2015 | Matsuda | B64C 29/02 |
| | | | 244/7 A |
| 2017/0217585 A1* | 8/2017 | Hulsman | B64C 39/024 |
| 2018/0002003 A1* | 1/2018 | Won | B64C 39/024 |

* cited by examiner

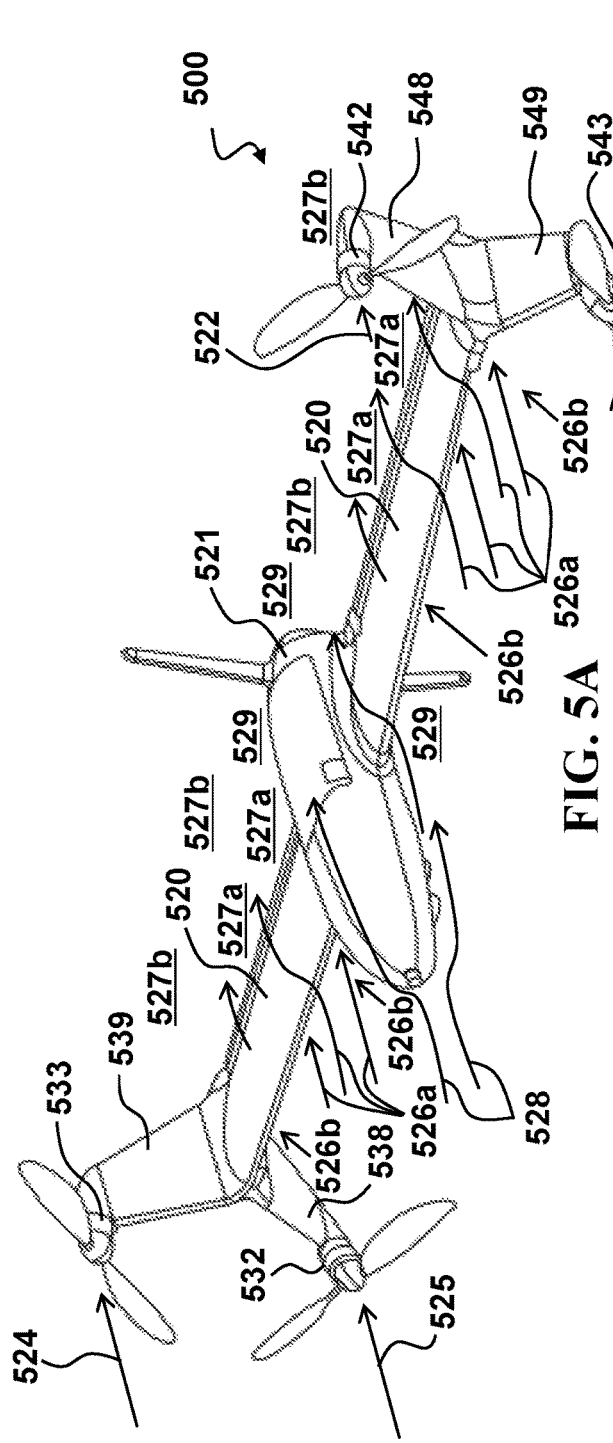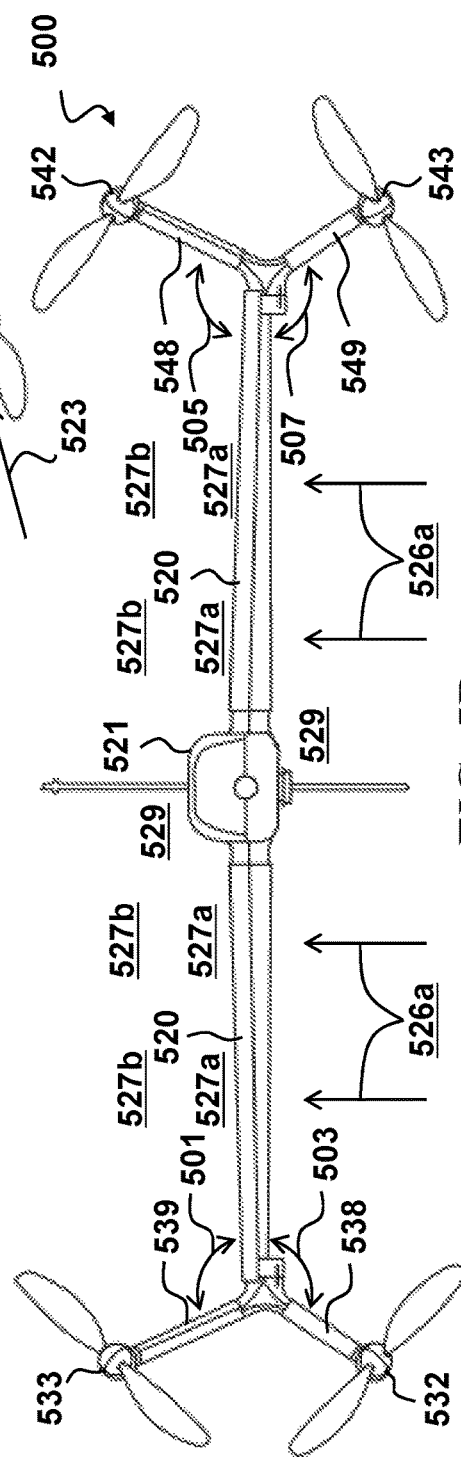
FIG. 5A
FIG. 5B

VERTICAL TAKE-OFF AND LANDING (VTOL) WINGED AIR VEHICLE WITH COMPLEMENTARY ANGLED ROTORS

CROSS-REFERENCE TO RELATED APPLICATIONS

This application claims priority to and the benefit of U.S. Provisional Patent Application No. 62/345,618, filed Jun. 3, 2016, the contents of which are hereby incorporated by reference herein for all purposes.

TECHNICAL FIELD

Embodiments relate generally to unmanned aerial vehicles (UAV), and more particularly to vertical take-off and landing (VTOL) UAV.

BACKGROUND

Vertical take-off and landing (VTOL) aerial vehicles may take-off vertically, transition from vertical flight to horizontal flight, and fly forward horizontally. Quadrotor aerial vehicles have four motors and four propellers that are all aligned vertically toward a longitudinal axis of the quadrotor. The size of the propellers in a quadrotor is significant relative to the overall size of the quadrotor in order to provide appropriate control over the quadrotor and to reduce the power required to fly the quadrotor.

SUMMARY

Exemplary aircraft embodiments may include: a fuselage; a wing extending from both sides of the fuselage, the wing having a first side and a second side; a first pair of motors disposed at a first end of the wing distal from the fuselage, where one motor of the first pair of motors is on the first side of the wing, and the other motor of the first pair of motors is on the second side of the wing; a second pair of motors disposed at a second end of the wing distal from the fuselage, where the second end of the wing is opposite the first end of the wing, one motor of the second pair of motors is on the first side of the wing, and the other motor of the second pair of motors is on the second side of the wing; where each motor may be angled to provide a component of thrust by a propeller attached thereto that for a desired aircraft movement may apply a resulting torque additive to a resulting torque created by rotating the propellers. Each motor may be angled between 5 and 35 degrees from a longitudinal axis of the aircraft. In other embodiments, each motor may be angled about 10 degrees from a longitudinal axis of the aircraft. Each motor may be angled within a first plane generally perpendicular to a planform of the wing. In other embodiments, each motor may be angled within a first plane generally perpendicular to a plane defined by the planform of the wing.

Exemplary method embodiments may include: providing substantially equal thrust to a top port motor, a bottom port motor, a top starboard motor, and a bottom starboard motor of a vertical takeoff and landing (VTOL) aircraft to achieve a vertical take-off, where the top and bottom port motors may be disposed at a first end of a wing, the top and bottom starboard motors may be disposed at a second end of the wing distal from the first end of the wing, the top and bottom starboard motors may be angled away from each other within a first plane generally perpendicular to a plane of the wing; and the top and bottom port motors may be angled away from each other within a second plane generally perpendicular to the plane of the wing; increasing thrust to the top motors, and decreasing thrust to the bottom motors to produce a net moment about a center of mass of the VTOL aircraft and cause the aircraft to pitch forward; and increasing thrust to the top motors, and increasing thrust to the bottom motors to achieve horizontal flight, where the wing of the VTOL aircraft provides primary lift in horizontal flight.

Additional method embodiments may include: increasing thrust to the top two motors, and decreasing thrust to the bottom two motors in horizontal flight to pitch the VTOL aircraft down. Additional method embodiments may include: decreasing thrust to the top two motors, and increasing thrust to the bottom two motors in horizontal flight to pitch the VTOL aircraft up.

Additional method embodiments may include: increasing thrust to the top port and bottom starboard motors, and decreasing thrust to the top starboard and bottom port motors in horizontal flight to roll the VTOL aircraft clockwise relative to a rear view of the VTOL aircraft. Additional method embodiments may include: decreasing thrust to top port and bottom starboard motors, and increasing thrust to top starboard and bottom port motors in horizontal flight to roll the VTOL aircraft counter-clockwise relative to a rear view of the VTOL aircraft.

Additional method embodiments may include: increasing thrust to both the port motors and decreasing thrust to both the starboard motors in horizontal flight to yaw the VTOL aircraft starboard. Additional method embodiments may include: decreasing thrust to both the port motors and increasing thrust to both the starboard motors in horizontal flight to yaw the VTOL aircraft port.

Exemplary vertical take-off and landing (VTOL) aerial vehicle embodiments may include: a wing, the wing having a first side and a second side; a first motor assembly disposed at a first end of the wing, the first motor assembly including: a first motor disposed on the first side of the wing, where the first motor may be angled from vertical away from the first side of the wing; a first winglet, where the first motor may be spaced apart from the first end of the wing by the first winglet; a second motor disposed on the second side of the wing, where the second motor may be angled from vertical away from the second side of the wing; a second winglet, where the second motor may be spaced apart from the first end of the wing by the second winglet; where each motor may be angled to provide a component of thrust by a propeller attached thereto that for a desired aircraft movement applies a resulting torque additive to the resulting torque created by rotating the propellers.

In additional aerial vehicle embodiments, the first motor assembly may further include: a first motor pod disposed on the first side of the wing, where the first motor pod includes a first motor pod structure for supporting the first motor and a first propeller; and a second motor pod disposed on the second side of the wing, where the second motor pod may include a second motor pod structure for supporting the second motor and a second propeller. The aerial vehicle may also include: a second motor assembly disposed at a second end of the wing, where the second motor assembly is distal from the first motor assembly, the second motor assembly including: a third motor disposed on the first side of the wing, where the third motor may be angled from vertical away from the first side of the wing; a third winglet, where the third motor may be spaced apart from the second end of the wing by the third winglet; a fourth motor disposed on the second side of the wing, where the fourth motor may be angled from vertical away from the second side of the wing; a fourth winglet, wherein the fourth motor may be spaced apart from the second end of the wing by the fourth winglet.

In additional aerial vehicle embodiments, the first and second winglets may be substantially perpendicular to a plane of the wing. The first and second winglets may each be disposed at an obtuse angle to a plane of the wing. The angle of the motors may be determined by a desired lateral force component needed to provide at least one of: a sufficient yaw in vertical flight and a sufficient roll in horizontal flight. A variation in thrust between the first motor and the second motor may create a resulting moment applied to the aircraft to move the aircraft in a controlled manner. The angle of each motor may be between 5 and 35 degrees from vertical.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 5A depict a perspective view of an exemplary VTOL aerial vehicle where each of the winglets is disposed at an obtuse angle from a plane of a wing;

FIG. 5B depicts a front view of the exemplary VTOL aerial vehicle of FIG. 5A;

DETAILED DESCRIPTION

The present system allows for a vertical take-off and landing (VTOL) aerial vehicle having four motors angled from vertical. Two sets of motors are on each end of a wing of the aerial vehicle, and the motors are separated from the ends of the wing by respective winglets. Two motors are on a top side, and two motors are on a bottom side of the aerial vehicle. The angling of the motors relative to a plane of the wing provides a lateral component of thrust for each motor. This thrust may apply a resulting torque additive to resulting torque created by rotating the rotors. Varying the thrust of each of the motors imparts a moment to urge the aerial vehicle to rotate about a center of mass of the aerial vehicle without changing the angles of the motors or their respective propeller blade pitches. The location the angled motors at the tips of the wing provides an extended distance from a centerline or center of mass of the aerial vehicle, which creates a longer moment arm such that smaller amounts of lateral thrust are needed to achieve a desired movement of the aerial vehicle. Utilizing a fixed pitch propeller reduces the need for a more expensive hub for a variable pitch propeller, increases the durability of the aerial vehicle, and reduces the weight of the aerial vehicle, while still providing the needed maneuverability of the aerial vehicle. The aerial vehicle may be autonomous and/or controlled by a remote user via a ground control system.

Figure 1:
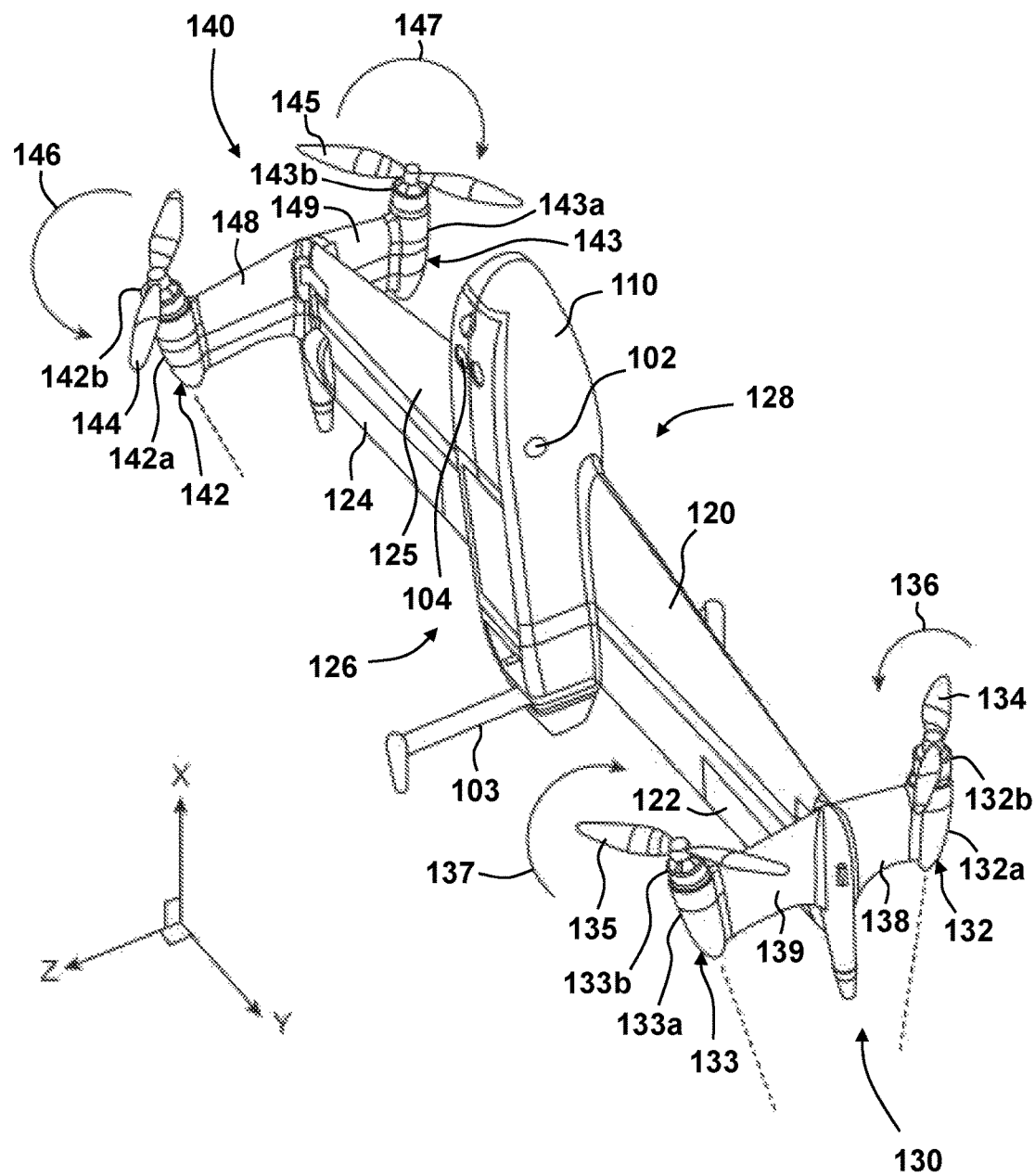
FIG. 1 depicts a perspective view of an exemplary vertical take-off and landing (VTOL) aerial vehicle.

FIG. 1 depicts a perspective view of an exemplary vertical take-off and landing (VTOL) aerial vehicle 100. The aerial vehicle 100 may be capable of vertical take-off and landing, hovering, vertical flight, maneuvering in a vertical orientation, transitioning between vertical and horizontal flight, and maneuvering in a horizontal orientation during forward flight. The aerial vehicle 100 may be controlled by an on-board control system that adjusts thrust to each of the motors 132b, 133b, 142b, 143b and control surfaces 122, 124. The on-board control system may include a processor having addressable memory and may apply differential thrust of the motors 132b, 133b, 142b, 143b to apply both forces and torque to the aerial vehicle 100.

The aerial vehicle 100 includes a fuselage 110 and a wing 120 extending from both sides of the fuselage 110. The wing 120 may include control surfaces 122, 124 positioned on either side of the fuselage 110. In some embodiments, the wing 120 may not include any control surfaces to reduce weight and complexity. A top side or first side 128 of the wing 120 may be oriented upwards relative to the ground during horizontal flight. A bottom side or second side 126 of the wing 120 may be oriented downwards relative to the ground during horizontal flight. The wing 120 is positioned in and/or about a wing plane 125. The wing plane 125 may be parallel to an x-y plane defined by the x-y-z coordinate system as shown in FIG. 1, where the x-direction is towards a longitudinal axis of aerial vehicle 100 and the y-direction is towards a direction out along the wing 120. The wing 120 may generally lie and/or align to the wing plane 125. In some embodiments, the wing 120 may define or otherwise have a planform of the wing that defines a plane that the wing is positioned at least symmetrically about.

One or more sensors 104 may be disposed in the fuselage 110 of the aerial vehicle 100 on the second side 126 to capture data during horizontal forward flight. The sensor 104 may be a camera, and any images captured during flight of the aerial vehicle 100 may be stored and/or transmitted to an external device. The sensor 104 may be fixed or pivotable relative to the fuselage 110 of the aerial vehicle 100. In some embodiments, the sensors 104 may be swapped based on the needs of a mission, such as replacing a LIDAR with an infrared camera for nighttime flights.

The aerial vehicle 100 is depicted in a vertical orientation, as it would be positioned on the ground prior to take-off or after landing. Landing gear 103 may maintain the aerial vehicle 100 in this vertical orientation. In some embodiments, the landing gear 103 may act as a vertical stabilizer during horizontal forward flight of the aerial vehicle 100.

A first motor assembly 130 is disposed at a first end or tip of the wing 120 distal from the fuselage 110. The first motor assembly 130 includes a pair of motor pods 132, 133 including pod structures 132a, 133a and motors 132b, 133b;

winglets 138, 139; and propellers 134, 135. A top port motor pod 132 may include a top port pod structure 132a supporting a top port motor 132b. A rotor or propeller 134 may be driven by the top port motor 132b to provide thrust for the aerial vehicle 100. The top port motor pod 132 may be disposed on the first side 128 of the wing 120 and may be separated from the first end of the wing 120 by a spacer or winglet 138. The motor 132b applies a moment or torque on the propeller 134 to rotate it and in so doing applies an opposing moment or torque 136 on the aerial vehicle 100. The opposing moment 136 acts to rotate or urge the aerial vehicle 100 to rotate about its center of mass 102. The moment 136 may change in conjunction with the speed of the propeller 134 and as the propeller 134 is accelerated or decelerated. The propeller 134 may be a fixed or variable pitch propeller.

The motor pod 132, the motor 132b, and the propeller 134 may all be aligned to be angled up in the direction of the first side 128 of the wing 120, up from the x-y plane in the negative z-direction, from the vertical while being within a plane of the winglet 138, such that any force, and force components thereof, generated by the propeller 134 shall align, and/or be within, the plane of the winglet 138, such that lateral forces to the plane of the winglet 138 are minimized or not generated. The alignment of the motor 132b and the propeller 134 may be a co-axial alignment of their respective axes of rotation.

The angle that the motor 132b and rotor 134 axes are from the vertical, x-direction, may vary from 5 to 35 degrees. In one exemplary embodiment, the angle may be about 10 degrees from vertical. The angle of the motor 132b and rotor 134 axes may be determined by the desired lateral force component needed to provide sufficient yaw in vertical flight and/or sufficient roll in horizontal flight, such as that necessary to overcome wind effects on the wing 120. This angle may be minimized to maximize the vertical thrust component for vertical flight and the forward thrust component for horizontal flight.

The angling of the axis of rotation of the motor 132b and propeller 134 from the vertical, but aligned with the plane of the winglet 138 and/or with a plane perpendicular to the wing plane 125, provides for a component of the thrust generated by the operation of the propeller 134 to be vertical, in the x-direction, and another component of the thrust to be perpendicular to the wing 120, in the negative z-direction. This perpendicular component of the thrust may act upon a moment arm along the wing 120 to the center of mass 102 of the aerial vehicle 100 to impart a moment to cause, or at least urge, the aerial vehicle 100 to rotate about its vertical axis when the aerial vehicle 100 is in vertical flight, and to roll about the horizontal axis when the aircraft is in forward horizontal flight. In some embodiments, this component of thrust perpendicular to the wing 120, or the negative z-direction, may also be applied in a position at the propeller 134 that is displaced a distance from the center of mass 102 of the aircraft 100, such as to apply a moment to the aerial vehicle 100 to cause, or at least urge, the aerial vehicle 100 to pitch about its center of mass 102. This pitching may cause, or at least facilitate, the transition of aerial vehicle 100 from vertical flight to horizontal flight, and from horizontal flight to vertical flight.

A bottom port motor pod 133 may include a bottom port pod structure 133a supporting a bottom port motor 133b. The bottom port motor 133b is disposed on the second side 126 of the wing 120 opposing the top port motor 132b. A rotor or propeller 135 may be driven by the bottom port motor 133b to provide thrust for the aerial vehicle 100. The bottom port motor pod 133 may be disposed on the second side 126 of the wing 120 and may be separated from the first end of the wing 120 by a spacer or winglet 139.

The motor 133b applies a moment or torque on the propeller 135 to rotate it and in so doing applies an opposing moment or torque 137 on the aerial vehicle 100. The opposing moment 137 acts to rotate or urge the aerial vehicle 100 to rotate about its center of mass 102. The moment 137 may change in conjunction with the speed of the propeller 135 and as the propeller 135 is accelerated or decelerated. The propeller 135 may be a fixed or variable pitch propeller.

The motor pod 133, the motor 133b, and the propeller 135 may all be aligned to be angled down in the direction of the second side 126 of the wing 120, down from the x-y plane in the z-direction, from the vertical while being within a plane of the winglet 139, such that any force, and force components thereof, generated by the propeller 135 shall align, and/or be within, the plane of the winglet 139, such that lateral forces to the plane of the winglet 139 are minimized or not generated. The alignment of the motor 133b and the propeller 135 may be a co-axial alignment of their respective axes of rotation.

The angle that the motor 133b and propeller 135 axes are from the vertical, x-direction, may vary from 5 to 35 degrees. In one exemplary embodiment, the angle may be about 10 degrees from vertical. The angle of the motor 133b and propeller 135 axes may be determined by the desired lateral force component needed to provide sufficient yaw in vertical flight and/or sufficient roll in horizontal flight, such as that necessary to overcome wind effects on the wing 120. This angle may be minimized to maximize the vertical thrust component for vertical flight and the forward thrust component for horizontal flight.

The angling of the axis of rotation of the motor 133b and propeller 135 from the vertical, but aligned with the plane of the winglet 139 and/or with the plane perpendicular to the wing plane 125, provides for a component of the thrust generated by the operation of the propeller 135 to be vertical, in the x-direction, and another component of the thrust to be perpendicular to the wing 120, in the z-direction. This perpendicular component of the thrust may act upon a moment arm along the wing 120 to the center of mass 102 of the aerial vehicle 100 to impart a moment to cause, or at least urge, the aerial vehicle 100 to rotate about its vertical axis when the aerial vehicle 100 is in vertical flight, and to roll about the horizontal axis when the aircraft is in forward horizontal flight. In some embodiments, this component of thrust perpendicular to the wing 120, or the z-direction, may also be applied in a position at the propeller 135 that is displaced a distance from the center of mass 102 of the aircraft 100, such as to apply a moment to the aerial vehicle 100 to cause, or at least urge, the aerial vehicle 100 to pitch about its center of mass 102. This pitching may cause, or at least facilitate, the transition of aerial vehicle 100 from vertical flight to horizontal flight, and from horizontal flight to vertical flight.

In some embodiments, the winglets 138, 139 may be at least substantially symmetric about a first winglet plane perpendicular to the wing plane 125. The first winglet plane may be substantially parallel to the x-z plane of the coordinate system shown in FIG. 1. Vertical in the winglet plane may be defined by the intersection of the wing plane 125 and the plane of the winglets 138, 139, which can be the x-direction shown.

A second motor assembly 140 is disposed at a second end or tip of the wing 120 distal from the fuselage 110 and distal from the first motor assembly 130. The second motor assembly 140 includes a pair of motor pods 143, 144 including pod structures 143a, 144a and motors 143b, 144b; winglets 148, 149; and propellers 144, 145. A top starboard motor pod 143 may include a top starboard pod structure 143a supporting a top starboard motor 143b. A rotor or propeller 145 may be driven by the top starboard motor 143b to provide thrust for the aerial vehicle 100. The top starboard motor pod 143 may be disposed on the first side 128 of the wing 120 and may be separated from the second end of the wing 120 by a spacer or winglet 149. The motor 143b applies a moment or torque on the propeller 145 to rotate it and in so doing applies an opposing moment or torque 147 on the aerial vehicle 100. The opposing moment 147 acts to rotate or urge the aerial vehicle 100 to rotate about its center of mass 102. The moment 147 may change in conjunction with the speed of the propeller 145 and as the propeller 145 is accelerated or decelerated. The propeller 145 may be a fixed or variable pitch propeller.

The motor pod 143, the motor 143b, and the propeller 145 may all be aligned to be angled up in the direction of the first side 128 of the wing 120, up from the x-y plane in the negative z-direction, from the vertical while being within a plane of the winglet 149, such that any force, and force components thereof, generated by the propeller 147 shall align, and/or be within, the plane of the winglet 149, such that lateral forces to the plane of the winglet 149 are minimized or not generated. The alignment of the motor 143b and the propeller 145 may be a co-axial alignment of their respective axes of rotation.

The angle that the motor 143b and propeller 145 axes are from the vertical, x-direction, may vary from 5 to 35 degrees. In one exemplary embodiment, the angle may be about 10 degrees from vertical. The angle of the motor 143b and propeller 145 axes may be determined by the desired lateral force component needed to provide sufficient yaw in vertical flight and/or sufficient roll in horizontal flight, such as that necessary to overcome wind effects on the wing 120. This angle may be minimized to maximize the vertical thrust component for vertical flight and the forward thrust component for horizontal flight.

The angling of the axis of rotation of the motor 143b and propeller 145 from the vertical, but aligned with the plane of the winglet 149 and/or with the plane perpendicular to the wing plane 125, provides for a component of the thrust generated by the operation of the propeller 145 to be vertical, in the x-direction, and another component of the thrust to be perpendicular to the wing 120, in the negative z-direction. This perpendicular component of the thrust may act upon a moment arm along the wing 120 to the center of mass 102 of the aerial vehicle 100 to impart a moment to cause, or at least urge, the aerial vehicle 100 to rotate about its vertical axis when the aerial vehicle 100 is in vertical flight, and to roll about the horizontal axis when the aircraft is in forward horizontal flight. In some embodiments, this component of thrust perpendicular to the wing 120, or the negative z-direction, may also be applied in a position at the propeller 145 that is displaced a distance from the center of mass 102 of the aircraft 100, such as to apply a moment to the aerial vehicle 100 to cause, or at least urge, the aerial vehicle 100 to pitch about its center of mass 102. This pitching may cause, or at least facilitate, the transition of aerial vehicle 100 from vertical flight to horizontal flight, and from horizontal flight to vertical flight.

A bottom starboard motor pod 142 may include a bottom starboard pod structure 142a supporting a bottom starboard motor 142b. The bottom starboard motor 142b is disposed on the second side 126 of the wing 120 opposing the top starboard motor 143b. A rotor or propeller 144 may be driven by the bottom starboard motor 142b to provide thrust for the aerial vehicle 100. The bottom starboard motor pod 142 may be disposed on the second side 126 of the wing 120 and may be separated from the second end of the wing 120 by a spacer or winglet 148.

The motor pod 142, the motor 142b, and the propeller 144 may all be aligned to be angled down in the direction of the second side 126 of the wing 120, down from the x-y plane in the z-direction, from the vertical while being within a plane of the winglet 148, such that any force, and force components thereof, generated by the propeller 144 shall align, and/or be within, the plane of the winglet 148, such that lateral forces to the plane of the winglet 148 are minimized or not generated. The alignment of the motor 142b and the propeller 144 may be a co-axial alignment of their respective axes of rotation.

The angle that the motor 142b and propeller 144 axes are from the vertical, x-direction, may vary from 5 to 35 degrees. In one exemplary embodiment, the angle may be about 10 degrees from vertical. The angle of the motor 142b and propeller 144 axes may be determined by the desired lateral force component needed to provide sufficient yaw in vertical flight and/or sufficient roll in horizontal flight, such as that necessary to overcome wind effects on the wing 120. This angle may be minimized to maximize the vertical thrust component for vertical flight and the forward thrust component for horizontal flight.

The angling of the axis of rotation of the motor 142b and propeller 144 from the vertical, but aligned with the plane of the winglet 148 and/or with the plane perpendicular to the wing plane 125, provides for a component of the thrust generated by the operation of the propeller 144 to be vertical, in the x-direction, and another component of the thrust to be perpendicular to the wing 120, in the z-direction. This perpendicular component of the thrust may act upon a moment arm along the wing 120 to the center of mass 102 of the aerial vehicle 100 to impart a moment to cause, or at least urge, the aerial vehicle 100 to rotate about its vertical axis when the aerial vehicle 100 is in vertical flight, and to roll about the horizontal axis when the aircraft is in forward horizontal flight. In some embodiments, this component of thrust perpendicular to the wing 120, or the z-direction, may also be applied in a position at the propeller 144 that is displaced a distance from the center of mass 102 of the aircraft 100, such as to apply a moment to the aerial vehicle 100 to cause, or at least urge, the aerial vehicle 100 to pitch about its center of mass 102. This pitching may cause, or at least facilitate, the transition of aerial vehicle 100 from vertical flight to horizontal flight, and from horizontal flight to vertical flight.

In some embodiments, the winglets 148, 149 may be at least substantially symmetric about a second winglet plane perpendicular to the wing plane 125. The first winglet plane may be parallel to the second winglet plane. The second winglet plane may be substantially parallel to the x-z plane of the coordinate system shown in FIG. 1. Vertical in the winglet plane may be defined by the intersection of the wing plane 125 and the plane of the winglets 148, 149, which can be the x-direction shown.

The motors 132b, 133b, 142b, 143b operate such that variations in the thrust, or rotation for fixed pitched rotors, and resulting torque or moment of pairs of the motors can create a resulting moment applied to the aerial vehicle 100 to move it in a controlled manner. Because of the angling off of the aircraft longitudinal centerline, vertical in hover and horizontal in forward horizontal flight, of each of the motors 132b, 133b, 142b, 143b, in addition to the moment imparted by the differential of the operation of the motors 132b, 133b, 142b, 143b a complementary force component is generated and applied to the aerial vehicle 100 to move it in the same manner.

Increasing thrust to the top two motors 132b, 143b, and decreasing thrust to the bottom two motors 133b, 142b in horizontal flight will cause the aerial vehicle 100 to pitch down. Decreasing thrust to the top two motors 132b, 143b, and increasing thrust to bottom two motors 133b, 142b in horizontal flight will cause the aerial vehicle 100 to pitch up. A differential between the thrust of the top two motors 132b, 143b and the bottom two motors 133b, 142b may be used to control the pitch of the aerial vehicle 100 during horizontal flight. In some embodiments, control surfaces 122, 124 on the wing 120 may also be used to supplement pitch control of the aerial vehicle 100. The separation of the top and bottom motors by their respective winglets is needed to create the pitch moment of the aerial vehicle 100.

Increasing thrust to the top port motor 132b and bottom starboard motor 142b, and decreasing thrust to the top starboard motor 143b and bottom port motor 133b in horizontal flight will cause the aerial vehicle 100 to roll clockwise relative to a rear view of the aerial vehicle 100. Decreasing thrust to top port motor 132b and bottom starboard motor 142b, and increasing thrust to the top starboard motor 143b and bottom port motor 133b in horizontal flight will cause the aerial vehicle 100 to roll counter-clockwise relative to a rear view of the aerial vehicle 100. A differential between the thrust of the top port and bottom starboard motors and the top starboard and bottom port motors may be used to control roll of the aerial vehicle 100 during horizontal flight. In some embodiments, control surfaces 122, 124 on the wing 120 may also be used to supplement roll control of the aerial vehicle 100.

Increasing thrust to both port motors 132b, 133b and decreasing thrust to both starboard motors 142b, 143b in horizontal flight will cause the aerial vehicle 100 to yaw towards starboard. Decreasing thrust to both port motors 132b, 133b and increasing thrust to both starboard motors 142b, 143b in horizontal flight will cause the aerial vehicle 100 to yaw towards port. A differential between the thrust of the top and bottom starboard motors 142b, 143b and the top and bottom port motors 132b, 133b may be used to control yaw of the aerial vehicle 100 during horizontal flight.

In some embodiments, the motors 132b, 133b, 142b, 143b may be detachable from their respective pod structures 132a, 133a, 142a, 143a to allow for quick replacement of a damaged or defective motor. In other embodiments, the motor assemblies 130, 140 may be detachable from the tips of the wing 120 to allow for quick replacement of a damaged or defective motor, housing, or winglet, such as damage due to landing or during flight. The motors 132b, 133b, 142b, 143b, pod structures 132a, 133a, 142a, 143a, and/or motor assemblies 130, 140 may be replaced with other components based on a desired flight mission, such as a greater thrust for increased wind conditions or greater efficiency for longer missions. In some embodiments, the propellers 134, 135, 144, 145 may be disposed forward of a center of gravity 102 of the aerial vehicle 100.

Figure 2:
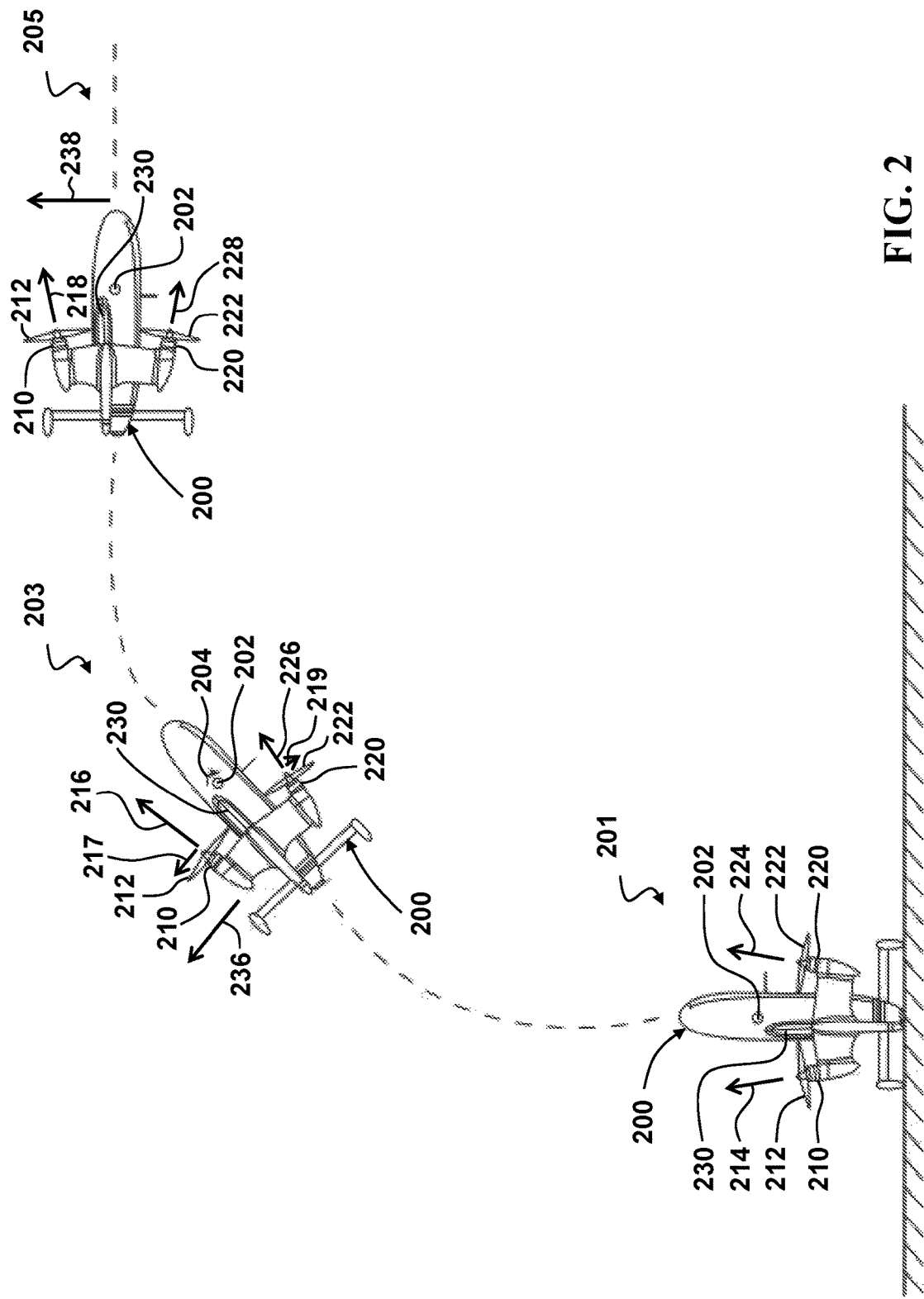
FIG. 2 depicts an exemplary VTOL aerial vehicle transitioning from vertical flight to horizontal flight by varying the thrust produced by its motors.

FIG. 2 depicts an exemplary VTOL aerial vehicle 200 transitioning from vertical flight to horizontal flight by varying the thrust produced by its motors. The aerial vehicle 200 is in a first position 201 on the ground ready for vertical take-off. A top motor 210 connected to a top propeller 212 is angled outward from vertical and away from a wing 230. A bottom motor 220 connected to a bottom propeller 222 is angled outward from vertical and away from the wing 230. The top motor 210 and bottom motor 220 are positioned at an end of the wing 230 of the aerial vehicle 200 and may be separated from the wing 230 by a winglet or spacer. Additional top and bottom motors and corresponding propellers may be present behind the top motor 210 and bottom motor 220 and positioned on the opposing end of the wing 230, such as shown in FIG. 1.

An on-board controller having a processor and addressable memory may send a signal to the motors to produce thrust needed for vertical take-off and subsequent adjustments to thrust during flight. Flight control may be anonymous, pre-programmed, and/or controlled by an external user at a ground control system. Top motors 210 create top thrust 214, and bottom motors create bottom thrust 224. During vertical take-off, the top thrust 214 and bottom thrust 224 may be substantially equal. The top thrust 214 and the bottom thrust 224 are depicted as angled based on the angles of the respective motors 210, 220 and propellers 212, 222 to have both a vertical and a lateral component.

The aerial vehicle 200 is in a second position 203 transitioning from vertical flight to horizontal flight. The aerial vehicle 200 pitches forward by increasing a top thrust 216 produced by the top motor 210 and decreasing a bottom thrust 226 produced by the bottom motor 220. This thrust differential produces a net moment 204 about a center of mass 202 of the aerial vehicle 200, which causes the aerial vehicle 200 to pitch forward. The component of the top thrust 216 in the lateral direction 217 is greater than the opposing lateral thrust 219 from the bottom thrust 226, and the lateral thrust 217 adds to the lift 236 created by the wing 230.

The aerial vehicle 200 is in a third position 205 in forward horizontal flight. The wing lift 238 is carrying the weight of the aerial vehicle 200. As the top thrust 218 and bottom thrust 228 are adjusted, the aerial vehicle 200 may be pitched up or down. Adjusting thrust to the motors on the opposing end of the wing 230 of the aerial vehicle 200 may allow the aerial vehicle 200 to be yawed left or right by differential thrust between the right and left sides.

Figure 3A:
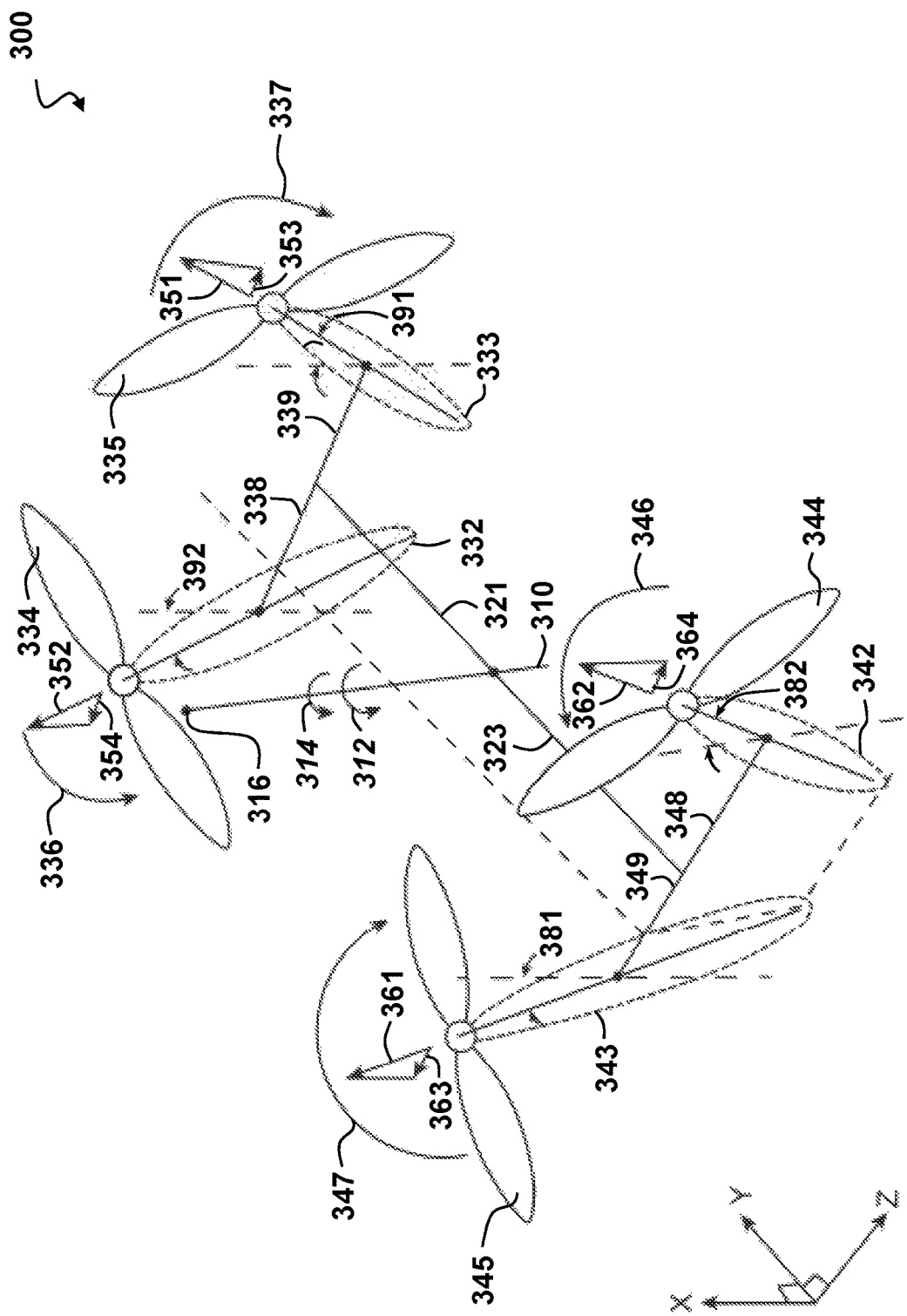
FIG. 3A depicts a perspective view of a schematic of an exemplary VTOL aerial vehicle positioned vertically for vertical flight.
Figure 3B:
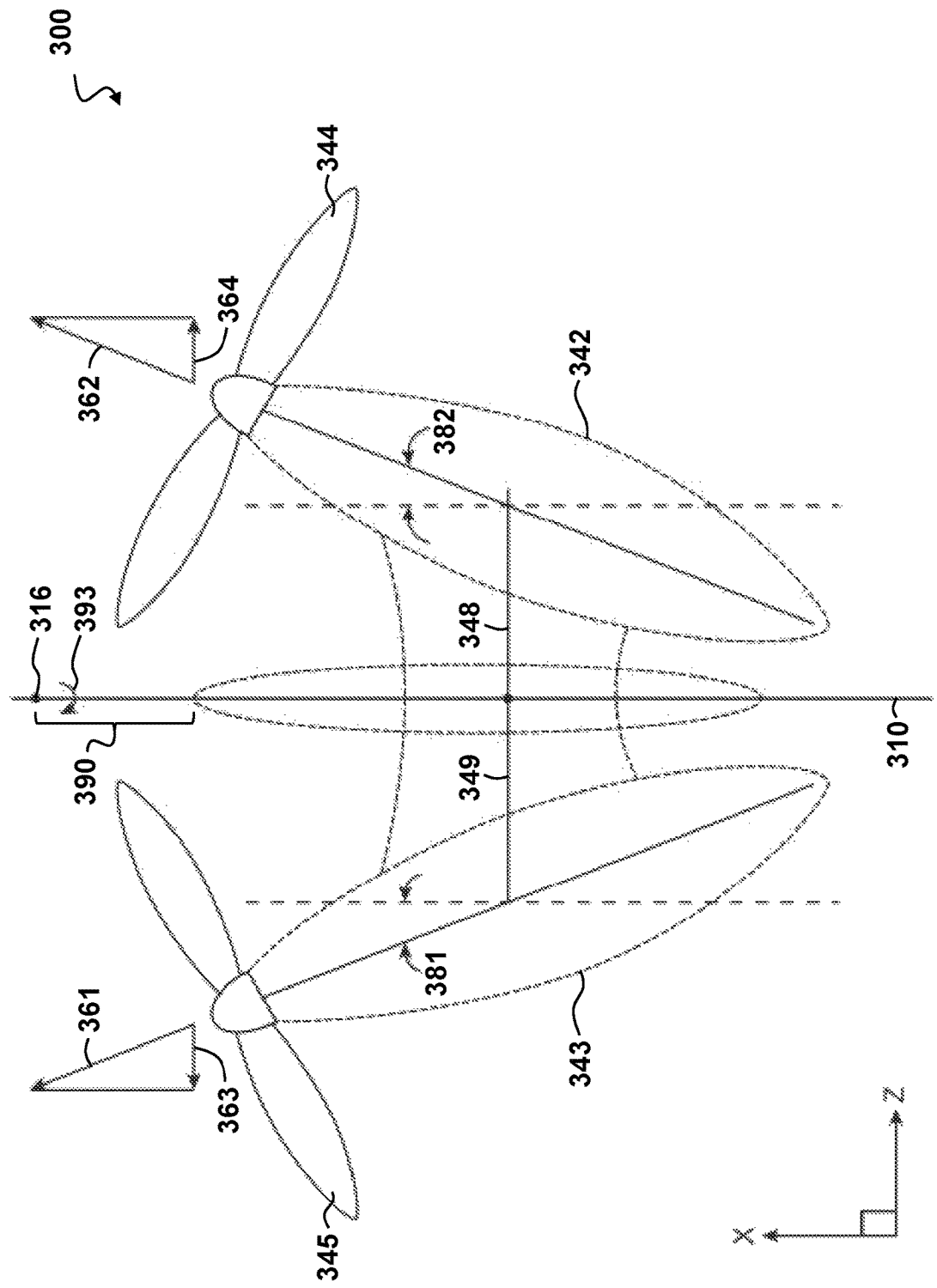
FIG. 3B depicts a side view of a schematic of the exemplary VTOL aerial vehicle of FIG. 3A.

FIG. 3A depicts a perspective view of a schematic of an exemplary VTOL aerial vehicle 300 positioned vertically for vertical flight. FIG. 3B depicts a side view of a schematic of the exemplary VTOL aerial vehicle 300 of FIG. 3A. The aerial vehicle 300 includes a center of mass 316 on a centerline 310. The wing 321, 323 and winglets 338, 339, 348, 349 of the aerial vehicle 300 are represented by solid lines.

A bottom starboard motor pod 332 is depicted in dashed lines at the end of winglet 338. The motor pod 332 has an axis of rotation positioned at an angle 392 from vertical in a plane X-Z1 extending along and up and down winglets 338, 339 and perpendicular to the wing 321, 323. The angle 392 may be in a range from about 5 to 35 degrees. In some embodiments, the angle 392 may be at or about 10 degrees. The motor pod 332 may include a propeller 334, which applies a counter-clockwise, as viewed from the front of the aerial vehicle 300 as in FIG. 3A, torque or moment 336 to the aerial vehicle 300. The thrust 352 produced by the propeller 334 has a lateral component 354, which likewise imparts a torque or moment about the aerial vehicle 300.

A top starboard motor pod 333 is depicted in dashed lines at the end of winglet 339. The motor pod 333 has an axis of rotation positioned at an angle 391 from the vertical in the plane X-Z1 extending along and up and down winglets 338, 339, and perpendicular to the wing 321, 323. The angle 391 may be in a range from about 5 to 35 degrees. In some embodiments, the angle 391 may be at or about 10 degrees. The angle 391 of the top starboard motor pod 333 may be the same as the angle 392 of the bottom starboard motor pod 332. The motor pod 333 may include a propeller 335, which applies a clockwise, as viewed from the front of the aerial vehicle 300, torque or moment 337 to the aerial vehicle 300. The thrust 351 produced by the propeller 335 has a lateral component 353, which likewise imparts a torque or moment about the aerial vehicle 300. The moment created by lateral thrust 354 will be in the opposite direction of the moment created by the lateral thrust 353. The lateral thrust 354 may be greater than lateral thrust 353 depending on respective thrusts 352, 351.

A top port motor pod 342 is depicted in dashed lines at the end of winglet 348. The motor pod 342 has an axis of rotation positioned at an angle 382 from the vertical in a plane X-Z2 extending along and up and down winglets 348, 349, and perpendicular to the wing 321, 323. The angle 382 may be in a range from about 5 to 35 degrees. In some embodiments, the angle 382 may be at or about 10 degrees. The angle 382 of the top port motor pod 342 may be the same as the angle 391 of the top starboard motor pod and/or an inverse of the angle 392 of the bottom starboard motor pod 332. The motor pod 342 may include a propeller 344, which applies a counter-clockwise, as viewed from the front of the aerial vehicle 300, torque or moment 346 about the aerial vehicle 300. The thrust 362 produced by the propeller 344 has a lateral component 364, which likewise imparts a torque or moment about the aerial vehicle 300.

A bottom port motor pod 343 is depicted in dashed lines at the end of winglet 349. The motor pod 343 has an axis of rotation positioned at an angle 381 from the vertical in the plane X-Z2 extending along and up and down winglets 348, 349, and perpendicular to the wing 321, 323. The angle 381 may be in a range from about 5 to 35 degrees. In some embodiments, the angle 381 may be at or about 10 degrees. The angle 381 of the bottom port motor pod 343 may be the same as the angle 392 of the bottom starboard motor pod 332, as an inverse of the angle 382 of the top port motor pod 342, and/or as an inverse of the angle 391 of the top starboard motor pod. The motor pod 343 may include a propeller 345, which applies a clockwise, as viewed from the front of the aerial vehicle 300, torque or moment 347 about the aircraft 300. The thrust 361 produced by the propeller 345 has a lateral component 363, which likewise imparts a torque or moment about the aerial vehicle. The moment created by lateral thrust 364 will be in the opposite direction of the moment created by the lateral thrust 363. The lateral thrust 363 may be greater than lateral thrust 364 depending on their respective thrusts 361, 362.

As shown in FIG. 3B, the lateral thrust component 364 and lateral thrust component 363 are directed in the plane X-Z2 in opposing directions, such that when their respective propellers 344 and 345 are producing the same thrust 361, 362, e.g. in hover or steady-state forward flight, that lateral thrust components 363, 364 cancel each other out and don't provide a net moment or torque, about the y-axis, on to the aerial vehicle 300. However, if either one of the thrust components 361, 362 are larger, then the other then the lateral thrust components 363, 364 shall also be different, resulting in a net force applied to moment arm 390 about the center of mass 316 to create a moment or torque 393, which may cause the aerial vehicle 300 to pitch in the corresponding direction. As configured, this pitching moment is complementary to the pitching forces created by the differential thrust components in the x-direction created by the propellers 344, 345. Likewise, such is the case with the lateral thrust components 353, 354 of the starboard motor pods and propellers as shown in FIG. 3A.

Figure 4:
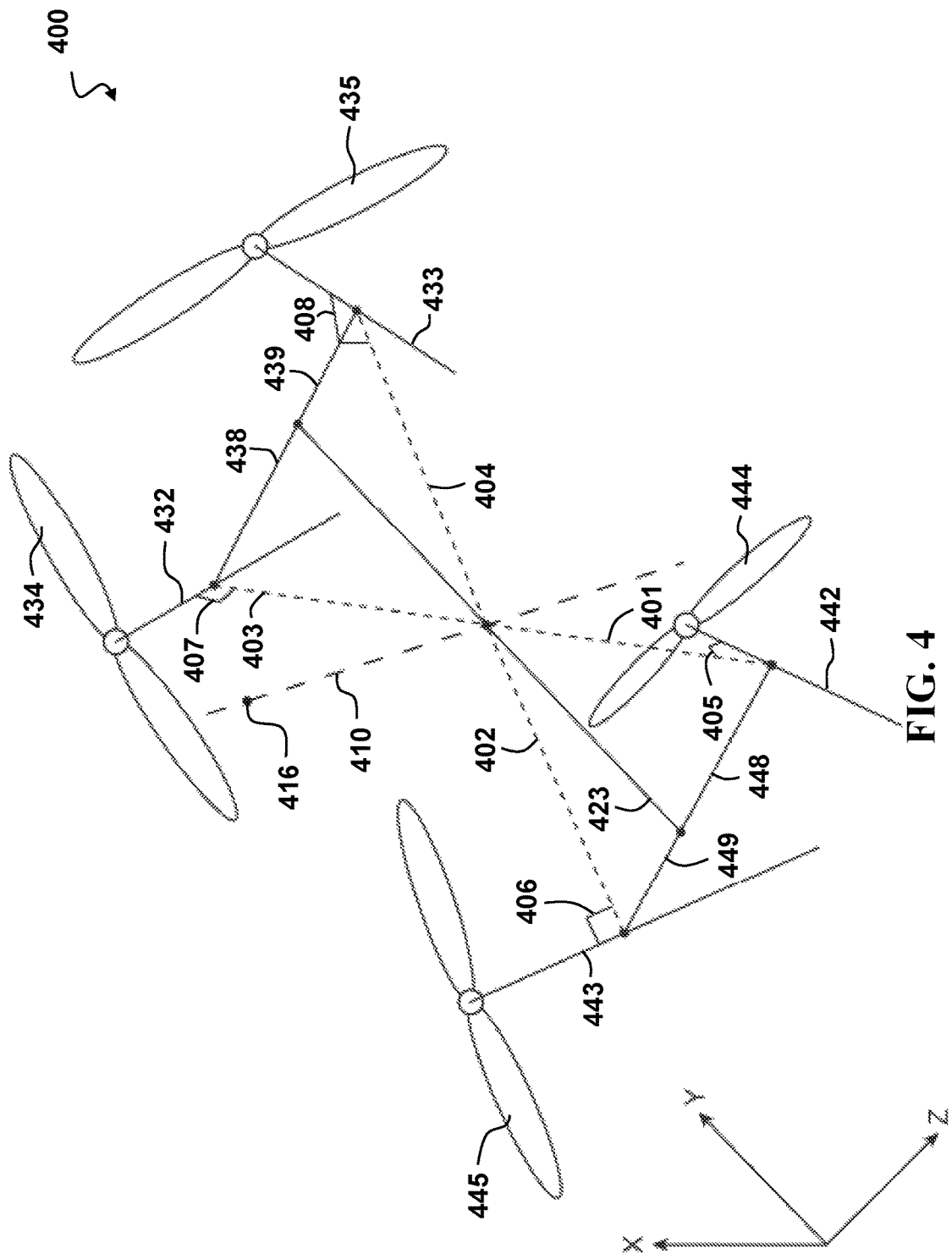
FIG. 4 depicts a perspective view of a schematic of an exemplary VTOL aerial vehicle where each motor is angled towards a centerline of the VTOL aerial vehicle.

FIG. 4 depicts a perspective view of a schematic of an exemplary VTOL aerial vehicle 400 where each motor is additionally angled towards a centerline of the aerial vehicle 400. The propellers or rotors 434, 435, 444, 445 are each positioned so that their thrust forces are orthogonal to a direct line back to a centerline 410 or a center of mass 416 of the aerial vehicle 400, but none of the propellers 434, 435, 444, 445 is parallel to another propeller 434, 435, 444, 445. The structure of the aerial vehicle 400 is represented by solid lines, including a wing 423 and winglets 438, 439, 448, 449. Lines 401, 402, 403, 404 are each drawn between the respective motor pods and the center of mass 416, and the center/thrust lines and axes of rotation are within planes parallel to the respective direct lines to the center of mass 416.

A bottom starboard motor pod 432 is aligned to be angled from the vertical, x-direction, but orthogonal 407 to a line 403 directly to the centerline 410 or the center of mass 416 of the aerial vehicle 400. The centerline of the motor pod 432, the axes of rotation of the motor, and of the propeller 434 are positioned within a plane perpendicular to the line 403. This positioning of the motor pod 432 will result in an inward, in the negative y-direction, tilt, cant, or angle from the vertical x-direction.

The top starboard motor pod 433 is aligned to be angled from the vertical, x-direction, but orthogonal 408 to a line 404 directly to the centerline 410 or the center of mass 416 of the aerial vehicle 400. The centerline of the motor pod 433, the axes of rotation its motor, and of the propeller 435 are positioned within a plane perpendicular to the line 404. This positioning of the motor pod 433 will result in an inward, in the negative y-direction, tilt, cant, or angle from the vertical x-direction.

The top port motor pod 442 is aligned to be angled from the vertical, x-direction, but orthogonal 405 to a line 401 directly to the centerline 410 or the center of mass 416 of the aerial vehicle 400. The centerline of the motor pod 442, the axes of rotation its motor, and of the propeller 444 are positioned within a plane perpendicular to the line 401. This positioning of the motor pod 442 will result in an inward, in the y-direction, tilt, cant, or angle from the vertical x-direction.

The bottom port motor pod 443 is aligned to be angled from the vertical, x-direction, but orthogonal 406 to a line 402 directly to the centerline 410 or the center of mass 416 of the aerial vehicle 400. The centerline of the motor pod 443, the axes of rotation its motor, and of the propeller 445 are positioned within a plane perpendicular to the line 402. This positioning of the motor pod 443 will result in an inward, in the y-direction, tilt, cant, or angle from the vertical x-direction.

FIG. 5A depict a perspective view of an exemplary VTOL aerial vehicle 500 where each of the winglets 538, 539, 548, 549 is disposed at an obtuse angle 501, 503, 505, 507 from a plane of a wing 520. FIG. 5B depicts a front view of the exemplary VTOL aerial vehicle 500 of FIG. 5A. The winglets 538, 539, 548, 549 are angled from a wing 520 or wing plane out towards each of the respective motor pods 532, 533, 542, 543. This angling of the winglets 538, 539, 548, 549 assists in limiting or preventing the formation of wingtip vortices, which in-turn increases the performance and efficiency of the wing 520. The winglets 538, 539, 548, 549 may be positioned or otherwise formed at a non-zero angle of attack to counteract the effect of the wingtip vortices.

Portions of the airflow 526 over the wing 520 and about the fuselage 521 of the aerial vehicle 500 is represented with arrows. The airflow 526a shows an airflow at or about, or otherwise substantially, zero angle of attack relative to the wing, such as would occur during forward horizontal or cruise flight. The airflow 526b shows a (non-zero) angle of attack relative to the wing, such as during a pitch-up, transition to/from vertical flight, and/or slow flight. The aerial vehicle 500 creates some turbulence 527a proximate the wing 520 as it travels through the air in horizontal flight with the airflow 526 and where the wing 520 typically is providing primary lift. The aerial vehicle 500 also creates turbulence 528 proximate the fuselage 521 during flight. At low or zero angles of attack of the airflow 526a, such as during a cruise horizontal flight, the effects of turbulence 527a from the wing 520 may be relatively small and close to the wing 520, as shown in FIG. 5A. At higher angles of attack of the airflow 526b, such as during a pitch up maneuver, the effects of turbulence 527b from the wing 520 may be increased and displaced further out from the wing 520, as shown in FIG. 5A. With the airflow 526a or 526b and with the turbulence 527a or 527b conditions, the winglets 538, 539, 548, 549 position the motors and corresponding propellers in clean air regions 522, 523, 524, 525 in front of and away from the turbulent air 527 coming off the wing 520. The position of the motors 532, 533, 542, 543 on the winglets 538, 539, 548, 549 are also far enough away from the fuselage turbulence 529 regions such that the likelihood of the rotors or propellers on the motors being in a region of disturbed air is low. Further, even if the motors and corresponding propellers are in a region of turbulent or disturbed air, the strength of the turbulent or disturbed air is significantly reduced by the time it reaches the one or more impacted motors and corresponding propellers.

Figure 7:
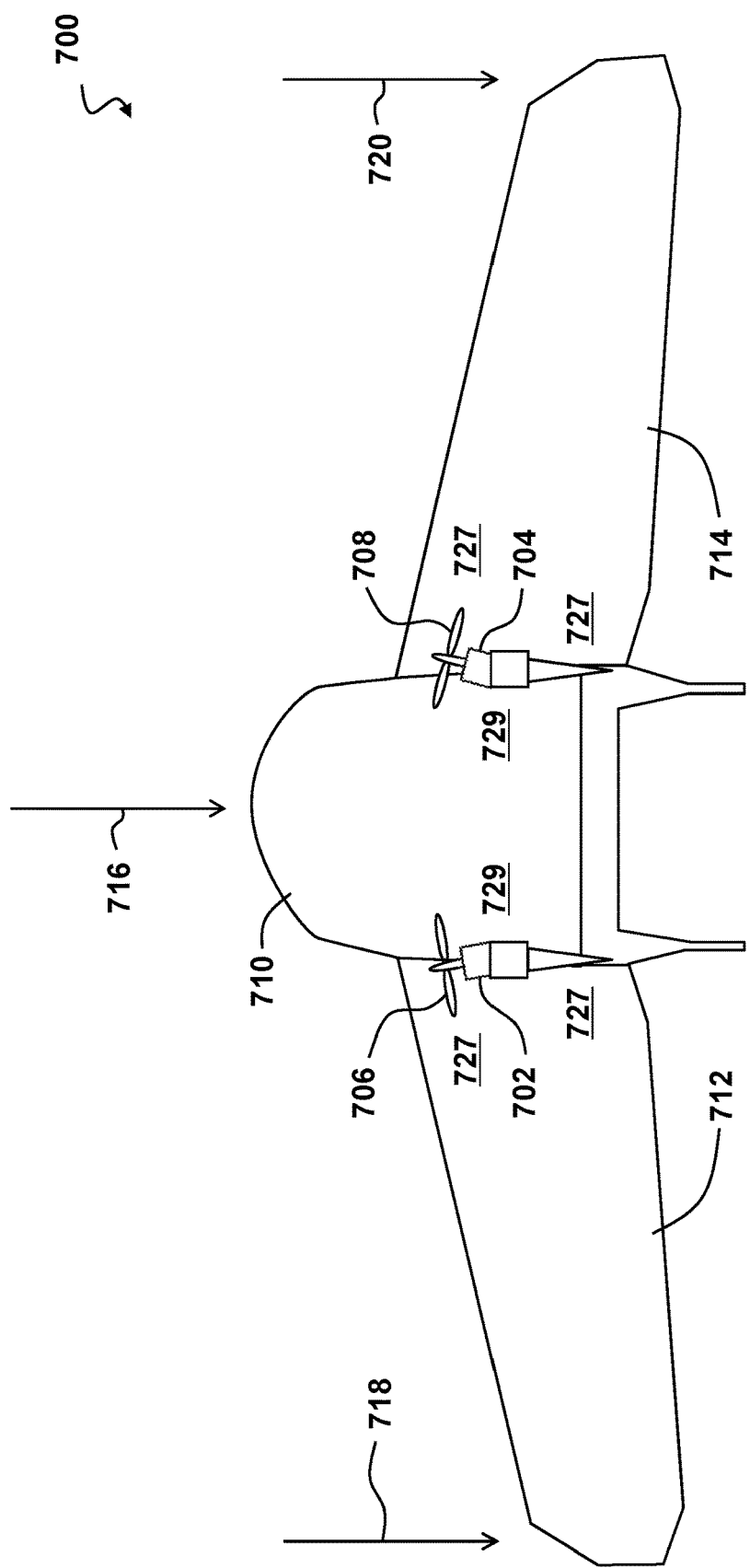
FIG. 7 depicts a front view of a limited vertical take-off and landing (VTOL) aerial vehicle having motors proximate a fuselage and angled in a plane parallel to a plane of a wing.

In contrast to the configuration of the aircraft 500 as shown in FIGS. 5a and 5b, the limited VTOL aerial vehicle 700 of FIG. 7 which has its motors 702, 704 positioned proximate to a fuselage 710 such that the motors and their respective rotors 706 and 708 are within the turbulence areas 727 caused by the airflow over and/or about the wings and the turbulence areas 729 caused by airflow over and/or about the fuselage 710.

The angling of the motors reduces the shaft torque requirement. Reducing the shaft torque requirement significantly reduces the motor weight requirement and increases the horizontal propeller efficiency. The angling of the motors also keeps the propeller wash in line with the supporting pylons.

A ratio of wing 520 length to top winglet 539, 548 length may be about 1.04:0.16. A ratio of wing 520 length to bottom winglet 538, 549 length may be about 1.04:0.13. A ratio of top winglet length 539, 548 to bottom winglet 538, 549 length may be about 0.82:0.66. A ratio of top motor distance to wing 520 plane to bottom motor distance to wing 520 plane may be about 0.75:0.57. A ratio of wing 520 length to aerial vehicle 500 length may be about 7.1:3.7. A ratio of wing 520 length to propeller length may be about 5.2:1.3. A ratio of top motor distance to a plane aligned with a center of mass parallel to the wing 520 plane to bottom motor distance to the plane aligned with the center of mass parallel to the wing plane may be about 1:1. A ratio of the distance from top starboard motor to bottom port motor to the distance from bottom starboard motor to top port motor may be about 1:1.

An angle of a line connecting a bottom starboard motor to a top port motor may be about thirteen degrees from a plane parallel to a plane of the wing 520. An angle of a line connecting a bottom port motor to a top starboard motor may be about thirteen degrees from a plane parallel to a plane of the wing 520. The angle 503, 507 of the bottom winglets 538, 549 relative to the plane of the wing 520 may be about 120 degrees. The angle 501, 505 of the top winglets 539, 548 relative to the plane of the wing 520 may be about 115 degrees.

Figure 6A:
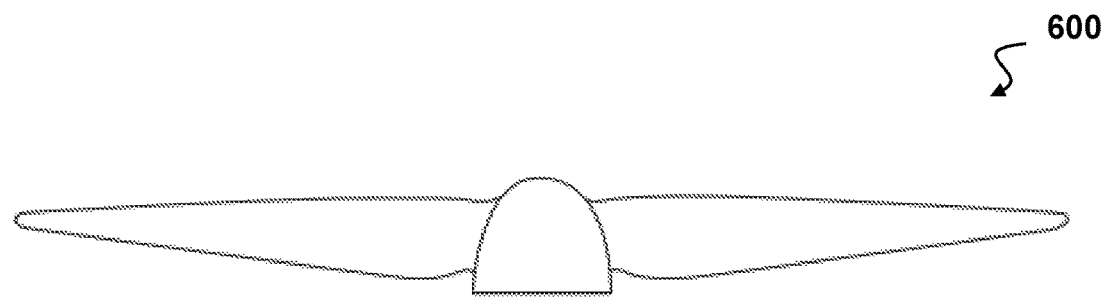
FIG. 6A depicts a front view of an exemplary propeller for an exemplary VTOL aerial vehicle.
Figure 6B:
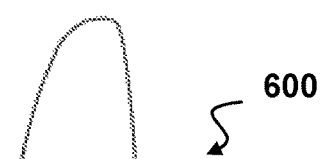
FIG. 6B depicts a top view of the exemplary propeller of FIG. 6A.
Figure 6C:
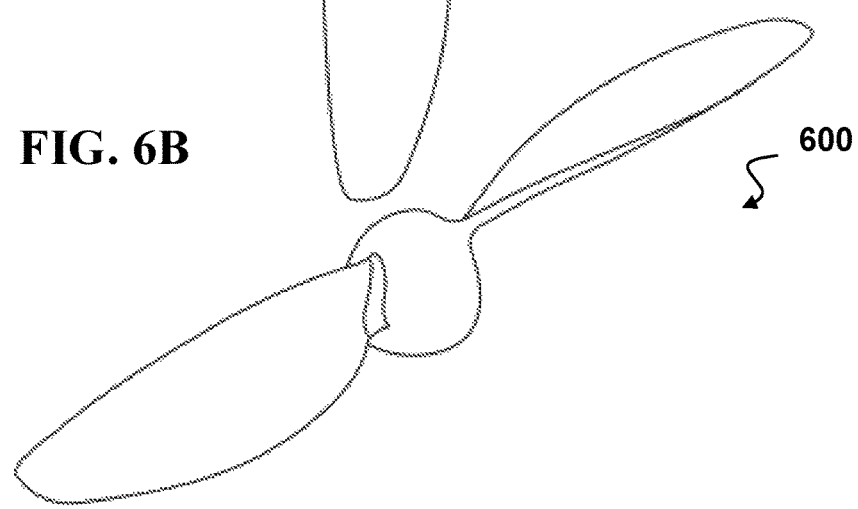
FIG. 6C depicts a perspective view of the exemplary propeller of FIG. 6A.

FIG. 6A depicts a front view of an exemplary propeller 600 for an exemplary VTOL aerial vehicle. FIG. 6B depicts a top view of the exemplary propeller 600 of FIG. 6A. FIG. 6C depicts a perspective view of the exemplary propeller 600 of FIG. 6A. The size of the propellers 600 used in the disclosed VTOL aerial vehicle is significantly smaller than existing quadcopters and VTOL aerial vehicles. The angling of the propellers 600 provides additive torque to a desired movement to increase the maneuverability of the VTOL aerial vehicle without requiring larger propellers that may be less efficient in forward horizontal flight. The propeller 600 is optimized to accommodate vertical flight yet maximize efficiency in horizontal flight. The planform, twist, and airfoils of the blades are tailored in a way that keeps horizontal flight efficiency near to that of a dedicated airplane propeller, while in vertical flight reduces the torque requirement on the motor, and maintains high design thrust margin.

FIG. 7 depicts a front view of a limited vertical take-off and landing (VTOL) aerial vehicle 700 having motors proximate a fuselage and angled in a plane parallel to a plane of a wing 712, 714. Two additional motors and corresponding propellers are present on the other side of the aerial vehicle 700. The limited aerial vehicle 700 has two motors 702, 704 and corresponding propellers 706, 708 that are only angled in the plane parallel to the plane of the wing 712, 714, i.e., the angle of the motors 702, 704 is perpendicular to the angle of the motors disclosed in the exemplary embodiments disclosed herein, such as in FIGS. 1 and 5A-5B. The limited aerial vehicle 700 has motors 702, 704 tilted in the direction of the plane along the wingspan rather than perpendicular to the wingspan. The angling of the motors 702, 704 in the limited aerial vehicle 700 in this plane along the wingspan does not facilitate pitching with a moment in that direction. Further, the downwash of the propeller creates a counter moment and added down-force on the supporting pylon/fin when in vertical flight.

The limited VTOL aerial vehicle 700 also positions the motors 702, 704 proximate to a fuselage 710 near a center of mass. During vertical flight, there is increased turbulence 716 from the fuselage 710 and/or wing 712, 714 due to a crosswind. The crosswind in the longitudinal direction will cause ingestion of stalled air during transition to and from horizontal flight when control is most important. This increased turbulence 716 creates negative effects on the motors 702, 704 disposed proximate to the fuselage 710. By contrast, both sets of motors are disposed proximate wing tips of the exemplary aerial vehicle in the exemplary embodiments disclosed herein. Clean air regions 718, 720 present near the wing tips of the exemplary embodiments disclosed herein allow for both a larger moment arm and reduced turbulence from crosswind. In the exemplary embodiments disclosed herein, the angling of the motors perpendicular to a wing plane and near wing tips does not induce an angle of attack on the support pylon/fin, and does not take away from the control authority produced by the vectored thrust, and reduces the power required to fly.

Figure 8:
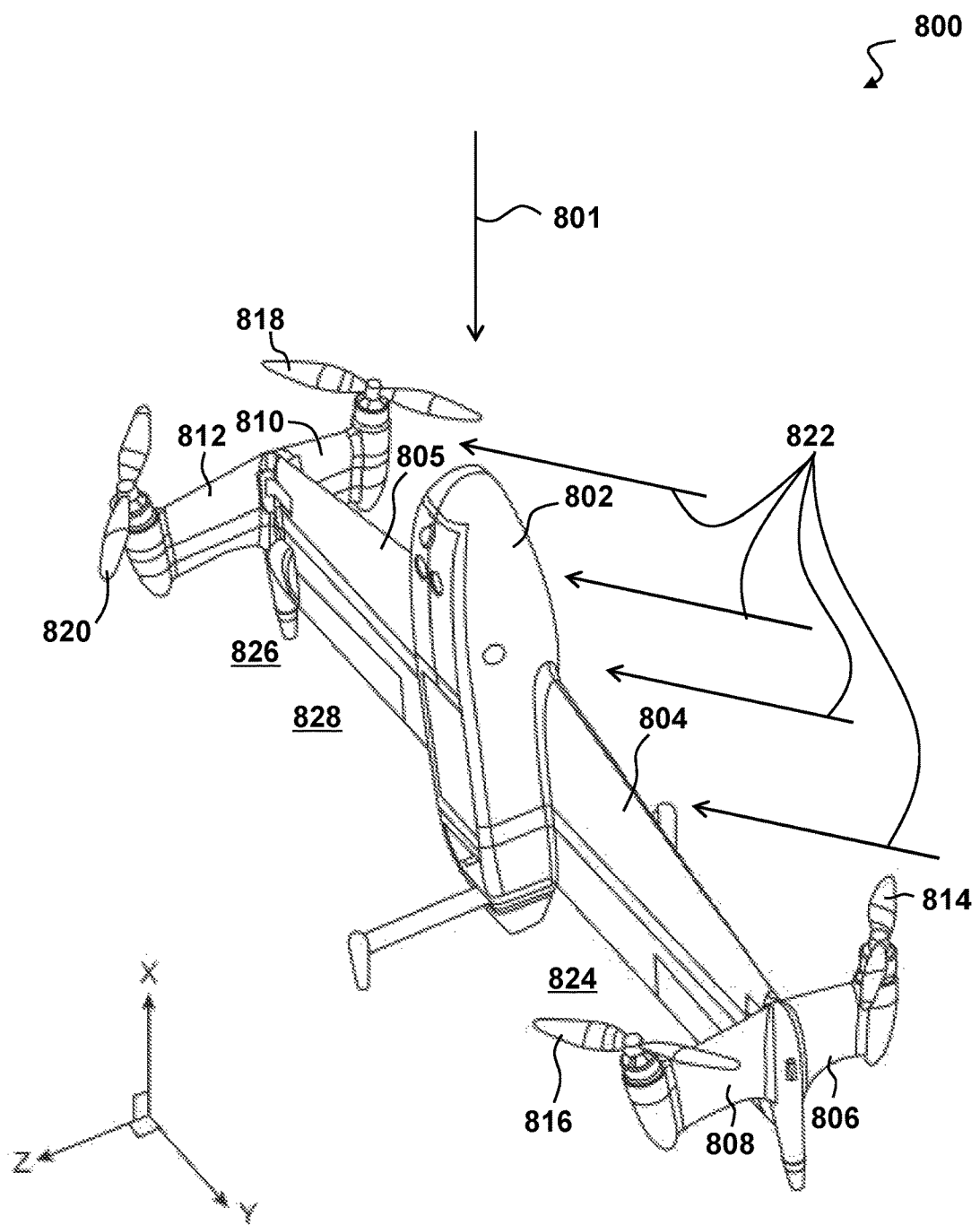
FIG. 8 depicts a perspective view of an exemplary VTOL aerial vehicle landing in a crosswind.

FIG. 8 depicts a perspective view of an exemplary VTOL aerial vehicle 800 landing 801 in a crosswind 822. Crosswind is wind having a perpendicular component to the direction of travel of an aerial vehicle. Crosswinds may cause take-off and landing to be more difficult for aerial vehicles using a runway. The effects of crosswind may be enlarged by VTOL aerial vehicles during vertical take-off and landing due to the expanded surface area of the wing and fuselage exposed to such crosswinds. These surfaces may create areas of turbulent air that may negatively impact the operation and efficiency of the propellers. In some VTOL aerial vehicles, this may necessitate larger motors and/or propellers to counteract the effects of a crosswind.

The exemplary VTOL aerial vehicle 800 is landing 801 in the negative x-direction as shown in the axis of FIG. 8. A strong crosswind 822 in the z- and negative y-directions urges the aerial vehicle 800 away from its intended landing position. The crosswind 822 impacts port wing 804, which causes an area of turbulent air 824 adjacent a bottom side of the port wing 804. The crosswind 822 also impacts the fuselage 802, which causes an area of turbulent air 826 adjacent a bottom side of the fuselage 802. The crosswind 822 also impacts the starboard wing 805, which causes an area of turbulent air 828 adjacent a bottom side of the starboard wing 805.

The propellers 814, 816, 818, 820 are each positioned away from the wing 804, 805 by corresponding winglets 806, 808, 810, 812. While the winglets 806, 808, 810, 812 are shown as perpendicular to the wing 804, 805, they may be positioned at an angle to the wing as in FIGS. 5A-5B. Further, the propellers 814, 816, 818, 820 are positioned above a leading edge of the wings 804, 805. Accordingly, the crosswind 822 may only create a region of turbulent air 828 affecting the bottom starboard propeller 820, with the other propellers 814, 816, 818 being unaffected by the turbulent air generated off the wings 804, 805 and/or the fuselage 802. However, the strength of the turbulent or disturbed air 828 is significantly reduced and dissipated by the time it reaches the bottom starboard propeller 820, because of the propeller 820 positioning away from the wing by winglet 812 and above the leading edge of the wing 805. Propellers 818, 814, 816 are in clean air regions. Accordingly, the aerial vehicle 800 may use smaller motors and/or propellers as the effects of crosswind are countered by the positioning of the propellers 814, 816, 818, 820 away from the wing 804, 805 and fuselage 802.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A method comprising:
providing substantially equal thrust to a top port motor, a bottom port motor, a top starboard motor, and a bottom starboard motor of a vertical takeoff and landing (VTOL) aircraft to achieve a vertical take-off, wherein the top and bottom port motors are disposed at a first end of a wing, wherein the top and bottom starboard motors are disposed at a second end of the wing distal from the first end of the wing, wherein the top and bottom starboard motors are angled away from each other within a first plane generally perpendicular to a plane of the wing; and wherein the top and bottom port motors are angled away from each other within a second plane generally perpendicular to the plane of the wing;
increasing thrust to the top motors, and decreasing thrust to the bottom motors to produce a net moment about a center of mass of the VTOL aircraft and cause the aircraft to pitch forward; and
increasing thrust to the top motors, and increasing thrust to the bottom motors to achieve horizontal flight, wherein the wing of the VTOL aircraft provides primary lift in horizontal flight.

2. The method of claim 1 further comprising: increasing thrust to the top two motors, and decreasing thrust to the bottom two motors in horizontal flight to pitch the VTOL aircraft down.

3. The method of claim 1 further comprising: decreasing thrust to the top two motors, and increasing thrust to the bottom two motors in horizontal flight to pitch the VTOL aircraft up.

4. The method of claim 1 further comprising: increasing thrust to the top port and bottom starboard motors, and decreasing thrust to the top starboard and bottom port motors in horizontal flight to roll the VTOL aircraft clockwise relative to a rear view of the VTOL aircraft.

5. The method of claim 1 further comprising: decreasing thrust to top port and bottom starboard motors, and increasing thrust to top starboard and bottom port motors in horizontal flight to roll the VTOL aircraft counter-clockwise relative to a rear view of the VTOL aircraft.

6. The method of claim 1 further comprising: increasing thrust to both the port motors and decreasing thrust to both the starboard motors in horizontal flight to yaw the VTOL aircraft starboard.

7. The method of claim 1 further comprising: decreasing thrust to both the port motors and increasing thrust to both the starboard motors in horizontal flight to yaw the VTOL aircraft port.

8. The method of claim 1 wherein each motor is angled between 5 and 35 degrees from a longitudinal axis of the aircraft.

9. The method of claim 1 further comprising: providing a lateral component of thrust for each motor based on an angle of each motor relative to the wing.

10. The method of claim 1 wherein each motor is angled from a longitudinal axis of the aircraft based on a desired lateral force component needed to provide a sufficient yaw in vertical flight for the VTOL aircraft.

11. The method of claim 1 wherein each motor is angled from a longitudinal axis of the aircraft based on a desired lateral force component needed to provide a sufficient roll in horizontal flight for the VTOL aircraft.

12. The method of claim 1 wherein a propeller is attached to each motor.

13. The method of claim 12 wherein each propeller is disposed distal from the wing, and wherein each propeller is in a clean air region away from turbulent air coming off the wing during horizontal flight.

14. The method of claim 12 wherein each propeller is a fixed pitch propeller.

15. The method of claim 1 further comprising: capturing data during horizontal flight via one or more sensors disposed in a fuselage of the VTOL aircraft.

16. The method of claim 15 wherein a sensor of the one or more sensors is a camera.

17. The method of claim 15 wherein a sensor of the one or more sensors is fixed relative to the fuselage of the VTOL aircraft.

18. The method of claim 15 wherein a sensor of the one or more sensors is pivotable relative to the fuselage of the VTOL aircraft.

19. The method of claim 1 further comprising: providing stabilization to the VTOL aircraft in horizontal flight via a vertical stabilizer.

20. The method of claim 19 further comprising: maintaining the VTOL aircraft in a vertical orientation prior to take-off or after landing via the vertical stabilizer.

* * * * *